United States Patent
Yu et al.

(10) Patent No.: US 12,176,838 B2
(45) Date of Patent: Dec. 24, 2024

(54) MOTOR CONTROL SYSTEM AND VEHICLE WITH SAME

(71) Applicant: BYD COMPANY LIMITED, Shenzhen (CN)

(72) Inventors: Yilong Yu, Shenzhen (CN); Luhui Xu, Shenzhen (CN); Zhiyong Du, Shenzhen (CN); Axi Qi, Shenzhen (CN); Guangming Yang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 252 days.

(21) Appl. No.: 17/789,976

(22) PCT Filed: Dec. 29, 2020

(86) PCT No.: PCT/CN2020/140926
§ 371 (c)(1),
(2) Date: Jun. 29, 2022

(87) PCT Pub. No.: WO2021/136279
PCT Pub. Date: Jul. 8, 2021

(65) Prior Publication Data
US 2022/0393632 A1    Dec. 8, 2022

(30) Foreign Application Priority Data
Dec. 31, 2019 (CN) .......................... 201911420460.9

(51) Int. Cl.
*H02P 29/028* (2016.01)
*B60L 3/00* (2019.01)

(52) U.S. Cl.
CPC .......... *H02P 29/028* (2013.01); *B60L 3/0061* (2013.01)

(58) Field of Classification Search
CPC ......... B60L 3/04; B60L 3/0084; H02P 29/028
(Continued)

(56) References Cited

U.S. PATENT DOCUMENTS

| 2014/0292231 A1 | 10/2014 | Kanada |
| 2019/0039644 A1* | 2/2019 | Bernon-Enjalbert ........................ B62D 5/0493 |
| 2019/0190423 A1 | 6/2019 | Kurokawa |

FOREIGN PATENT DOCUMENTS

| CN | 102969950 A | 3/2013 |
| CN | 103182948 A | 7/2013 |

(Continued)

OTHER PUBLICATIONS

Lee Ki-ho et al: "Implementation of approach to functional safety compliant brushless DC motor control system", 2013 13th International Conference on Control, Automation and Systems (ICCAS 2013), IEEE, Oct. 22, 2014 (Oct. 22, 2014), pp. 1438-1442, XP032705973 (Year: 2014).*

(Continued)

*Primary Examiner* — Todd Melton
*Assistant Examiner* — Vincent Feng
(74) *Attorney, Agent, or Firm* — Wenye Tan (57) ABSTRACT

The present disclosure provides an electric motor control system and a vehicle. The electric motor control system includes a motor drive module, a multi-core processing module, and a safety logic module. The multi-core processing module includes a main function core and a lockstep monitoring core. The main function core is configured to obtain sampling data, and when any one of the sampling data, a running status of the main function core, a motor control signal, and a running status of a motor is abnormal, the lockstep monitoring core outputs a safety trigger signal; and the safety logic module is configured to output an instruction for prohibiting execution of the motor control signal to the motor drive module when receiving the safety trigger signal.

12 Claims, 4 Drawing Sheets

(58) Field of Classification Search
USPC .......................................................... 701/22
See application file for complete search history.

(56) References Cited

FOREIGN PATENT DOCUMENTS

| | | |
|---|---|---|
| CN | 203434912 U | 2/2014 |
| CN | 204131435 U | 1/2015 |
| CN | 105216649 A | 1/2016 |
| CN | 106227106 A | 12/2016 |
| CN | 106462485 A | 2/2017 |
| CN | 107547026 A | 1/2018 |
| CN | 108493904 A | 9/2018 |
| CN | 108528523 A | 9/2018 |
| CN | 109728754 A | 5/2019 |
| CN | 110235358 A | 9/2019 |
| JP | 2009029172 A | 2/2009 |
| JP | 2016134049 A | 7/2016 |
| JP | 2017146897 A | 8/2017 |
| JP | 2017147841 A | 8/2017 |
| KR | 20080049380 A | 6/2008 |
| WO | 2016136815 A1 | 9/2016 |
| WO | 2019159598 A1 | 8/2019 |
| WO | WO-2019197057 A1 * | 10/2019 ........... G05B 19/406 |

OTHER PUBLICATIONS

Anonymous: "Vehicle Electrification Solutions Semiconductors for the next generation of electric vehicles", Aug. 20, 2019, XP093046511, URL: http://web.archive.org/web/20190820202323if_/https://www.nxp.com/docs/en/brochure/VEHICLE-ELECTRIFICATION-BR.pdf (Year: 2019).*

Ki-Ho Lee et al., "Implementation of Approach to Functional Safety Compliant Brushless DC motor Control System", 2014 14th International Conference on Control, Automation and System (ICCAS 2014), Oct. 22-25, 2014 in KINTEX, Gyeonggi-do, Korea.

Anonymous: Vehicle Electrification Solutions Semiconductors for the next generation of electric vehiclesr', Aug. 20, 2019 (Aug. 20, 2019), XP093046511, Retrieved from the Internet: URL:http://web.archive.org/web/20190820202323if_/https://www.nxp.com/docs/en/brochure/VEHICLE-ELECTRIFICATION-BR.pdf [retrieved on May 12, 2023].

* cited by examiner

MOTOR CONTROL SYSTEM AND VEHICLE WITH SAME

CROSS-REFERENCE TO RELATED APPLICATIONS

This application is a national stage entry under 35 U.S.C. § 371 of International Application No. PCT/CN2020/140926, filed on Dec. 29, 2020, which claims priority to Chinese Patent Application No. 201911420460.9, entitled "ELECTRIC MOTOR CONTROL SYSTEM AND VEHICLE WITH SAME" and field on Dec. 31, 2019, the entire contents of all of which are incorporated herein by reference.

FIELD

The present disclosure relates to the field of vehicles, and in particular, to an electric motor control system and a vehicle with the electric motor control system.

BACKGROUND

In the early stage of the development of new energy vehicles, a main development goal of the whole industry is to achieve functions and better performance, where architectural layers are fewer, functions coexist in a large range, diagnostic content is relatively simple, and coverage is mainly based on various protections. In the related art, an external low-voltage power supply, for example, at 12V/24V, supplies power to a control system through a discrete power supply circuit such as control chip+transformer+filter, to supply power to a main control unit, a sampling circuit, a logic chip field programmable gate array (FPGA)/complex programmable logic device (CPLD), and the like. The external low-voltage power supply supplies power to a power supply of a drive system through a discrete direct current (DC)/DC circuit. The main control unit acquires a three-phase current, a bus voltage, and a motor position, and performs motor control with reference to a target torque received by a controller area network (CAN). The CPLD/FPGA monitors a control signal, and performs overcurrent protection, overvoltage protection, overtemperature protection, and other rapid protection to ensure the reliability.

In addition, with the implementation and promotion of ISO 26262, an electric control solution is gradually evolved into a multi-layer complex system, risks brought by various failures start to be considered, and the risks are monitored, diagnosed, and troubleshot, to implement decoupling between functions, independence between control and diagnosis, and the like. The related art can no longer meet the requirements of the industry.

Currently, there are some shortcomings in the design of motor control systems. For example, some systems adopt a serial architecture. When any intermediate step fails, a system cannot timely and effectively ensure a control state, and consequently a whole vehicle has potential risks; and there is a lack of independence. Even if a diagnosis mechanism is implemented, when shared resources such as a power supply, a sampler, or a chip fail, the mechanism fails; and the requirements for functional safety in the ISO 26262 standard likely cannot be met.

SUMMARY

The present disclosure aims to resolve at least one of the technical problems existing in the related art. Therefore, an objective of the present disclosure is to provide an electric motor control system. The electric motor control system can implement layered independent control and improve the safety.

Another objective of the present disclosure is to provide a vehicle.

To achieve the foregoing objectives, an electric motor control system in an embodiment of a first aspect of the present disclosure includes a motor drive module; a multi-core processing module, including a main function core and a lockstep monitoring core, where the main function core is configured to: obtain sampling data, and generate a motor control signal according to the sampling data, the lockstep monitoring core is configured to monitor the sampling data of the main function core, a running status of the main function core, the motor control signal, and a running status of a motor, and when any one of the sampling data, the running status of the main function core, the motor control signal, and the running status of the motor is abnormal, the lockstep monitoring core performs drive control limitation and outputs a safety trigger signal; and a safety logic module, connected to the multi-core processing module, and configured to output an instruction for prohibiting execution of the motor control signal to the motor drive module when receiving the safety trigger signal.

According to the electric motor control system in this embodiment of the present disclosure, by using the multi-core processing module, a safety monitoring function is set in the lockstep monitoring core to implement safety diagnosis. When the main function core fails, a control permission of the main function core can be limited, and drive and diagnosis are independent of each other, and when the motor control signal is abnormal, the safety logic module is triggered to perform safety control, to implement independent control of drive and diagnosis mechanisms, which meets requirements of a relevant standard. When an intermediate step of controlling the motor fails, a control state can be timely and effectively ensured, thereby improving the safety.

According to the electric motor control system in this embodiment of the present disclosure, through multi-layer monitoring of the main function core and the running status of the motor, monitoring at layers of an input, processing, and an output of the main function core, and monitoring of the running status of the motor are implemented, thereby effectively improving the response performance and the safety.

To achieve the foregoing objectives, a vehicle in an embodiment of a second aspect of the present disclosure includes a motor and the electric motor control system. The electric motor control system is configured to control the motor.

According to the vehicle in this embodiment of the present disclosure, by using the electric motor control system in the foregoing embodiment, the independent control of the drive and diagnosis mechanisms can be implemented. Therefore, when an intermediate step of controlling the motor fails, a control state can be timely and effectively ensured, thereby improving the safety.

Additional aspects and advantages of the present disclosure are partially given in the following description, and partially become apparent in the following description or may be learned through the practice of the present disclosure.

BRIEF DESCRIPTION OF THE DRAWINGS

The foregoing and/or additional aspects and advantages of the present disclosure become more apparent and comprehensible in description of the embodiments with reference to the following accompanying drawings, where.

DETAILED DESCRIPTION

The embodiments of the present disclosure are described in detail below, and the embodiments described with reference to accompanying drawings are exemplary. The following describes the embodiments of the present disclosure in detail.

An electric motor control system according to the embodiments of the present disclosure is described below with reference to FIG. 1 to FIG. 4.

Figure 1:
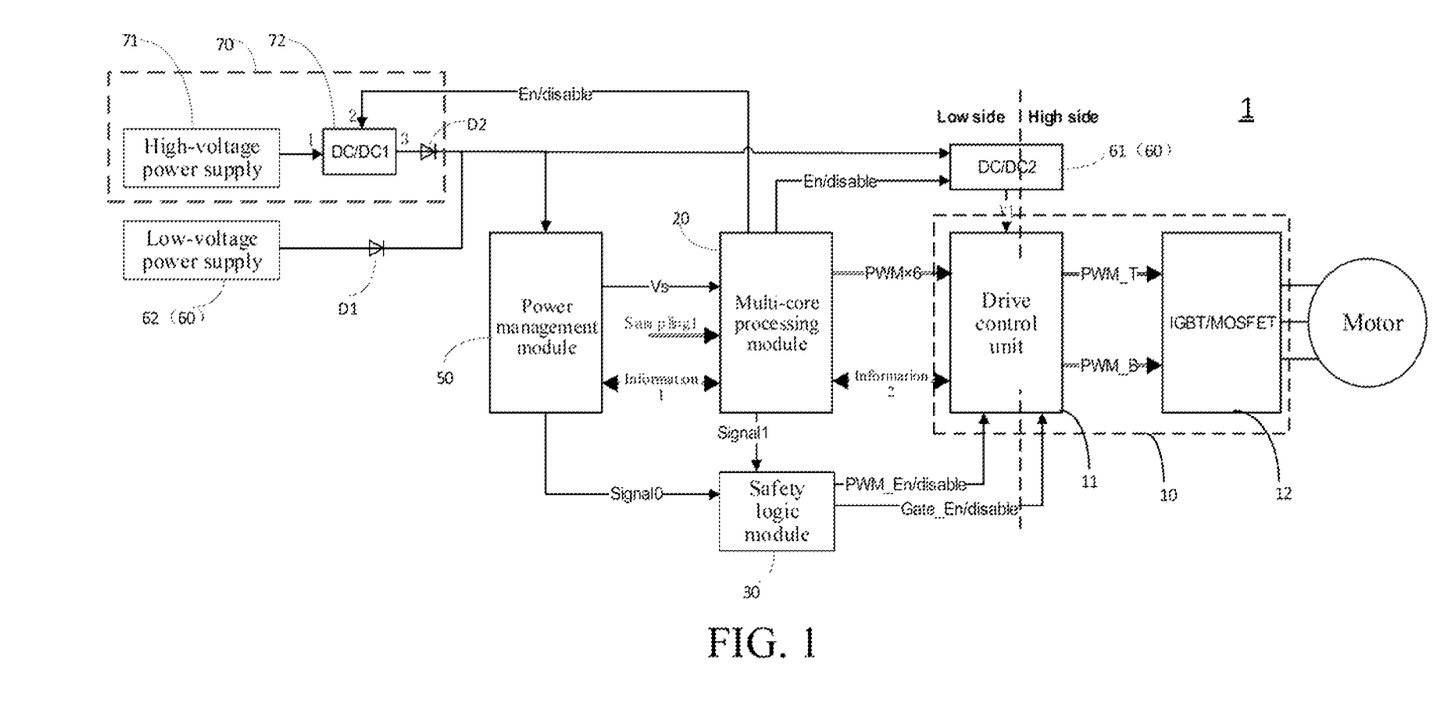
FIG. 1 is a block diagram of an electric motor control system according to an embodiment of the present disclosure.

FIG. 1 is a block diagram of an electric motor control system according to an embodiment of the present disclosure. As shown in FIG. 1, the electric motor control system 1 in this embodiment of the present disclosure includes a motor drive module 10, a multi-core processing module 20, and a safety logic module 30.

The motor drive module 10 may include a drive control unit 11 and a power module circuit 12. The power module circuit 12 may be an insulated gate bipolar transistor (IGBT) circuit, a metal-oxide-semiconductor field-effect transistor (MOSFET) circuit, or the like. A motor is controlled according to a motor control signal such as a pulse width modulation (PWM) signal. Specifically, the drive control unit 11 transmits a PWM signal of the multi-core processing module 20 to drive the power semiconductor IGBT or MOSFET, to drive the motor. In addition, drive of high side and low side system diagnosis may be performed.

Figure 2:
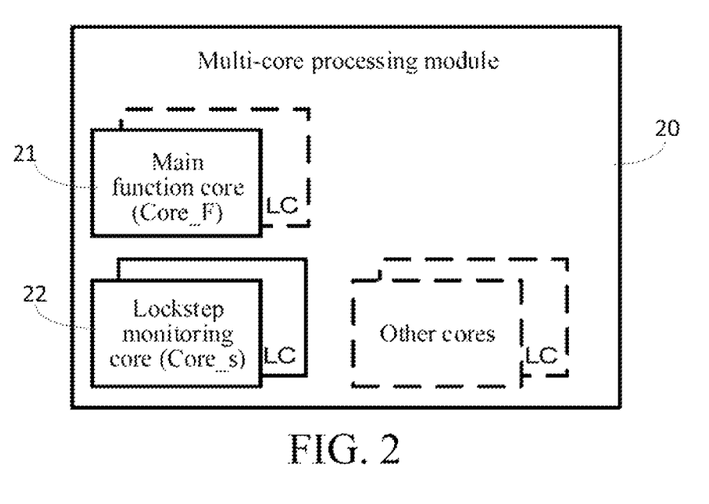
FIG. 2 is a block diagram of a multi-core processing module according to an embodiment of the present disclosure.

As shown in FIG. 2, the multi-core processing module 20 includes a main function core 21 and a lockstep monitoring core 22. Information such as information 2 is exchanged between the multi-core processing module 20 and the motor drive module 10. The main function core 21 is configured to: obtain sampling data, for example, data including a current, a voltage, an angle, and the like, generate a motor control signal according to the sampling data, and transmit the motor control signal such as a PWM signal to the drive control unit 11 of the motor, and then the drive control unit 11 may drive the motor according to the motor control signal. The lockstep monitoring core 22 is configured to monitor the sampling data of the main function core 21, a running status of the main function core 21, the motor control signal, and a running status of the motor. When any one of the sampling data, the running status of the main function core 21, the motor control signal, and the running status of the motor is abnormal, the lockstep monitoring core 22 performs drive control limitation and outputs a safety trigger signal.

Through multi-layer monitoring of the main function core and the running status of the motor, monitoring at layers of an input, processing, and an output of the main function core, and monitoring of the running status of the motor are implemented, thereby effectively improving the response performance and the safety. In an embodiment of the present disclosure, input information of the main function core 21 is sampling data information, processing information of the main function core 21 is the running status of the main function core 21, and output information of the main function core 21 is the motor control signal.

In an embodiment of the present disclosure, as shown in FIG. 2, the multi-core processing module 20 includes a number of processing cores, and the main function core 21 such as Core_F (where a lockstep function LC is optional) may include a current, a voltage, an angle, and the like by acquiring an external signal such as a sampling1 signal, and sends a control signal to control the motor. The lockstep monitoring core 22 with a lockstep function performs functional safety monitoring. That is, the safety monitoring function is set in the lockstep monitoring core 22 to monitor the running status of the main function core 21. When the main function core 21 fails, a control permission of the main function core 21 can be limited, and a safety trigger signal may be outputted, to enter a safe state. Other cores of the multi-core processing module 20 may perform other functions, and the corresponding lockstep functions LC (LOCK) are optional. This is not specifically limited herein.

The safety logic module 30 is connected to the multi-core processing module 20, and is configured to output an instruction for prohibiting execution of the motor control signal to the motor drive module 10 when receiving the safety trigger signal, to enter the safe state, thereby improving the safety. For example, as shown in FIG. 1, when the main function core 21 fails, the multi-core processing module 20 triggers the safety logic module 30 through a signal signal1, to trigger a low side PWM_En/disable signal and a high side Gate_En/disable signal, and controls the motor drive module 10 with a higher priority, to implement layered independent control, so that the system enters the safe state.

According to the electric motor control system 1 in this embodiment of the present disclosure, by using the multi-core processing module 20, a safety monitoring function is set in the lockstep monitoring core 22 to implement safety diagnosis. When the main function core 21 fails, a control permission of the main function core 21 can be limited, and drive and diagnosis are independent of each other, and when the motor control signal is abnormal, the safety logic module 30 is triggered to perform safety control, to implement independent control of drive and diagnosis mechanisms, which meets requirements of a relevant standard. When an intermediate step of controlling the motor fails, a control state can be timely and effectively ensured, thereby improving the safety.

Figure 3:
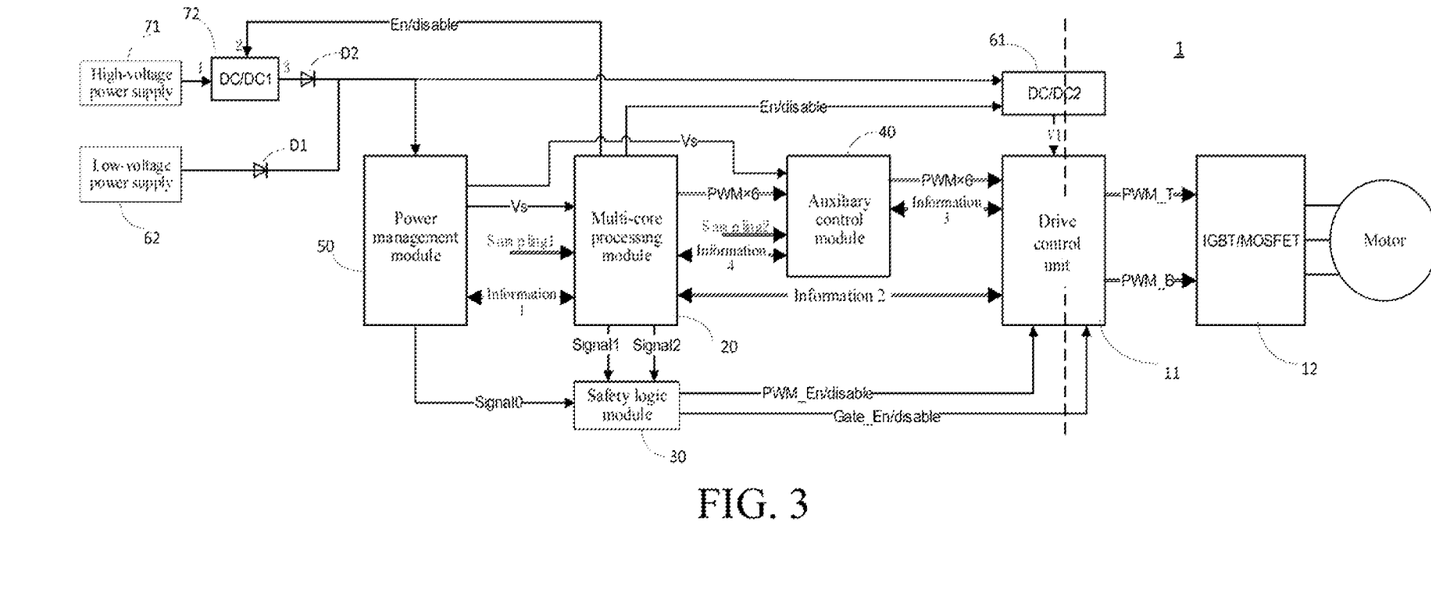
FIG. 3 is a block diagram of an electric motor control system according to an embodiment of the present disclosure.

Further, as shown in FIG. 3, the electric motor control system 1 in this embodiment of the present disclosure further includes an auxiliary control module 40. The auxiliary control module 40 is connected to the multi-core processing module 20 and the motor drive module 10, and is configured to: obtain sampling data, generate a motor control signal according to the sampling data when the main function core 21 fails, and send the motor control signal to the motor drive module 10, to continue to drive the motor.

Specifically, the auxiliary control module 40 may include an FPGA/CPLD, and the auxiliary control module 40 exchanges information with the multi-core processing module 20. When the main function core 21 runs normally, the auxiliary control module 40 receives a key signal sent by the main function core 21, such as a 6-channel PWM signal in the figure, processes the PWM signal, and transmits the processed PWM signal to the motor drive module 10, to drive the motor.

In an embodiment of the present disclosure, a sampling module acquires information such as a current, a voltage, and an angle of the motor, and separately outputs sampling data sampling1 and sampling data sampling2 that are transmitted to the multi-core processing module 20 and the auxiliary control module 40 respectively. When the main function core 21 fails, the auxiliary control module 40 acquires an external redundant signal such as sampling data 2, and generates a motor control signal according to the sampling data, and the auxiliary control module 40 exchanges information with the motor drive module 10, so that the motor drive module 10 may continue to drive the motor according to the motor control signal sent by the auxiliary control module 40. That is, when the main function core 21 fails, the auxiliary control module 40 takes over a drive control function.

Further, the lockstep monitoring core 22 is further configured to determine whether the motor control signal is abnormal when the auxiliary control module 40 fails. When the motor control signal is abnormal, the lockstep monitoring core 22 performs drive control limitation and outputs a safety trigger signal. The safety logic module 30 is connected to the multi-core processing module 20, and is configured to output the instruction for prohibiting the execution of the motor control signal to the motor drive module 10 when receiving the safety trigger signal. That is, when the main function core 21 runs normally, the main function core 21 sends the motor control signal. When the main function core 21 fails, the auxiliary control module 40 temporarily takes over the drive control function. When the auxiliary control module 40 also fails, if considering that the motor control signal is abnormal, the lockstep monitoring core 22 performs safety control, and sends the safety trigger signal to the safety logic module 30, to control the system to enter the safe state.

Specifically, the lockstep monitoring core 22 performs safety monitoring, such as input diagnosis, output diagnosis, crash monitoring of the main function core 21, and crash monitoring of the auxiliary control module 40 such as a CPLD/FPGA. When diagnosing an abnormality, the lockstep monitoring core 22 controls a drive unit through an independent channel, the safety logic module 30 switches a PWM channel under drive of a PWM_En/disable signal on the low side, and removes control permissions of the main function core 21 and a CPLD/FPGA functional layer, and the safety logic module 30 ensures, through the second signal Gate_En/disable on the high side, that the IGBT/MOSFET is in an off state/three-phase short-circuit state. That is, the system enters the safe state.

In an embodiment, as shown in FIG. 1 or FIG. 3, the electric motor control system 1 in this embodiment of the present disclosure further includes a power management module 50. Information such as the information 1 in FIG. 1 is exchanged between the power management module 50 and the multi-core processing 20. The power management module 50 is configured to: provide a power signal such as Vs to the multi-core processing module 20, monitor a running status of the multi-core processing module 20, and output a safety control signal when the multi-core processing module 20 fails. The safety logic module 30 is connected to the power management module 50, outputs an instruction for prohibiting execution of the motor control signal to the motor drive module 10 when receiving the safety control signal, to remove the motor drive function, and enables a switch tube of the motor drive module 10 to be turned off or the motor to be in a three-phase short-circuit state, that is, enter the safe state. That is, when the multi-core processing module 20 runs abnormally, the power management module 50 may trigger the safety logic module 30 to switch the system to the safe state.

As shown in FIG. 3, the power management module 50 monitors a status of the multi-core processing module 20. If the multi-core processing module 20 is abnormal, the power management module 50 triggers the safety logic module 30 through information. The safety logic module 30 triggers the PWM_En/disable signal and the Gate_En/disable signal, and controls the motor drive module 10 with a higher priority, to implement layered independent control.

According to the electric motor control system 1 in this embodiment of the present disclosure, when the main function core 21 of the multi-core processing module 20 fails, the FPGA/CPLD may temporarily take over the drive control function. When the FPGA/CPLD also fails, the lockstep monitoring core 22 performs safety control, to enhance the system availability, and the safety logic module 30 performs safety control, to implement multi-layer independent control, which is more applicable to control of a vehicle condition with more complex and multi-layer requirements, such as an autonomous driving system.

As shown in FIG. 1 or FIG. 3, the electric motor control system 1 in this embodiment of the present disclosure further includes a low-voltage power supply module 60. The low-voltage power supply module 60 is connected to the power management module 50 and the motor drive module 10, and is configured to stop supplying power to the motor drive module 10 when receiving a first power supply stop signal. The multi-core processing module 20 is connected to the low-voltage power supply module 60, and responds to the safety trigger signal outputted by the lockstep monitoring core 22. When the motor drive module 10 fails to respond to the safety trigger signal of the lockstep monitoring core 22 as expected, the lockstep monitoring core 22 outputs the first power supply stop signal, and the low-voltage power supply module 60 stops supplying power to the motor drive module 10, so that when the system is expected to enter the safe state, but actually the system does not enter the safe state as expected, the power supply of the low-voltage power supply module 60 may be disconnected to ensure that the system enters a no-output state.

Further, as shown in FIG. 1 or FIG. 3, the low-voltage power supply module 60 includes a first DC/DC unit 61 such as DC/DC2 and a low-voltage power supply 62. The low-voltage power supply 62 is connected to the first DC/DC unit 61 and the power management module 50 through a first reverse prevention diode D1, and is configured to supply power to the power management module 50. The first DC/DC unit 61 is connected to the motor drive module 10 and the multi-core processing module 20, and is configured to: supply power to the motor drive module 10, and stop outputting power when receiving the first power supply stop signal sent by the multi-core processing module 20, to ensure that the system enters the safe state, thereby improving the safety.

As shown in FIG. 1 or FIG. 3, the electric motor control system 1 in this embodiment of the present disclosure further includes a backup power supply module 70. The backup power supply module 70 is connected to the power management module 50 and the motor drive module 10, and is configured to output a power supply signal to supply power to the power management module 50 and the motor drive module 10 when receiving a first power supply signal.

The multi-core processing module 20 is connected to the backup power supply module 70, and is configured to output the first power supply signal to the backup power supply module 70 when an output of the low-voltage power supply 62 is abnormal.

By adding the backup power supply module 70 and controlling a connection and a disconnection of the power outputted by the backup power supply module, continuous running of the system can be timely and effectively ensured when the low-voltage power supply is abnormal.

Further, as shown in FIG. 1 or FIG. 3, the backup power supply module 70 in an embodiment of the present disclosure includes a high-voltage power supply 71 and a second DC/DC unit 72 such as DC/DC1. The high-voltage power supply 71 is connected to the power management module 50 and the first DC/DC unit 61 through the second DC/DC unit 72. The multi-core processing module 20 is connected to the second DC/DC unit 72. For example, the multi-core processing module 20 may control a connection and a disconnection of the second DC/DC unit 72 through En/disable. Specifically, the multi-core processing module is configured to: control the second DC/DC unit 72 to be connected when the output of the low-voltage power supply 62 is abnormal, or control the second DC/DC unit 72 to be disconnected when an output of the second DC/DC unit 72 is abnormal, to implement double assurance of the power supply.

Figure 4:
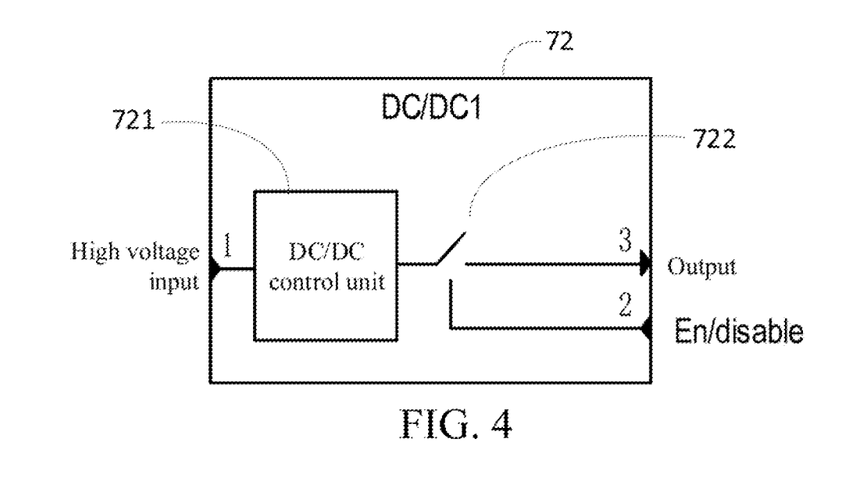
FIG. 4 is a block diagram of a second DC/DC unit according to an embodiment of the present disclosure.

As shown in FIG. 4, the second DC/DC unit 72 in an embodiment of the present disclosure includes a DC/DC control unit 721 and a switch unit 722. A first end of the DC/DC control unit 721 is connected to the high-voltage power supply 71. A first end of the switch unit 722 is connected to a second end of the DC/DC control unit 721, a second end of the switch unit 722 is connected to the power management module 50 and the first DC/DC unit 61 through a second reverse prevention diode D2, and a control end of the switch unit 722 is connected to the multi-core processing module 20. When the low-voltage power supply is abnormal, the multi-core processing module 20 controls the switch unit 722 to be turned on, and the backup power supply module 70 supplies power. Further, when the output of the backup power supply is abnormal, the multi-core processing module controls the switch unit 722 to be turned off. Therefore, the system can be prevented from being damaged due to the abnormality of the backup power supply. For example, if the backup power supply provides an excessively high voltage, the breakdown of a system device is caused. The switch unit 722 is directly arranged on a power supply circuit of the backup power supply, and may be turned off when the backup power supply is abnormal, thereby improving the system safety.

In some embodiments, as shown in FIG. 3, the safety logic module 30 includes a first enable end and a second enable end, the first enable end is connected to a low side of the motor drive system 10, and the second enable end is connected to a high side of the motor drive module 10. The multi-core processing module 20 is further configured to output a first safety trigger signal or a second safety trigger signal when the motor drive signal is abnormal, for example, for the system not provided with the auxiliary control module 40, when the main function core 21 fails, it is considered that the motor drive signal is abnormal, while for the system provided with the auxiliary control module 40, when both the main function core 21 and the auxiliary control module 40 are abnormal, it is considered that the motor drive signal is abnormal. The safety logic module 30 is configured to: enable the low side of the motor drive module through the first enable end according to the first safety trigger signal, or enable the high side of the motor drive module through the second enable end according to the second safety trigger signal, to stop driving the motor. For example, if receiving signal1, the safety logic module 30 outputs an enable signal PWM_EN/disable signal through the first enable end, switches a PWM channel on the low side of the drive of the motor drive module 10, removes control permissions of the main function core 21 and a CPLD/FPGA functional layer, and ensures, through the Gate_EN/disable signal on the high side, that the IGBT/MOSFET is in an off state/three-phase short-circuit state. After the drive control returns to normal, the motor drive module 10 may be enabled to switch back to a normal mode. In this embodiment, the multi-core processing module 20 may control two outputs of the safety logic module 30 through OR logic of Signal1 and Signal2, to enter the safe state, or may separately control the two outputs.

In an embodiment, the safety logic module 30 performs safety control by driving the high side of the motor drive module 10, to avoid a case that the system fails to normally enter or maintain the safe state due to a failure of an intermediate circuit, thereby improving the safety.

Accordingly, the electric motor control system 1 in an embodiment of the present disclosure adopts the multi-core processing 20 and is provided with the lockstep monitoring core 22 to perform safety monitoring. When the main function core 21 fails, the auxiliary control module 40 may take over the drive control function. Further, when the auxiliary control module 40 also fails, the lockstep monitoring core 22 may trigger the safety control, so that the system enters the safe state. In addition, when the multi-core processing module 20 fails, the power management module 50 may trigger the safety control, so that the system enters the safe state. Moreover, the backup power supply is provided. When the low-voltage power supply fails, the backup power supply may supply power. Further, the backup power supply is also controllable. When the power supply of the backup power supply is abnormal, the power supply may also be disconnected. According to the electric motor control system 1 in this embodiment of the present disclosure, the multi-layer independent control is adopted, and control and diagnosis are independent of each other. When shared resources such as a power supply, a sampler, and a chip fail, the diagnosis mechanism can also be effective, to reduce a probability of a failure or improve the availability that the system endures various failures, which is more applicable to complex and multi-layer control requirements, such as autonomous driving.

Based on the electric motor control system in the foregoing embodiments, a vehicle according to an embodiment of a second aspect of the present disclosure is described below with reference to FIG. 5.

Figure 5:
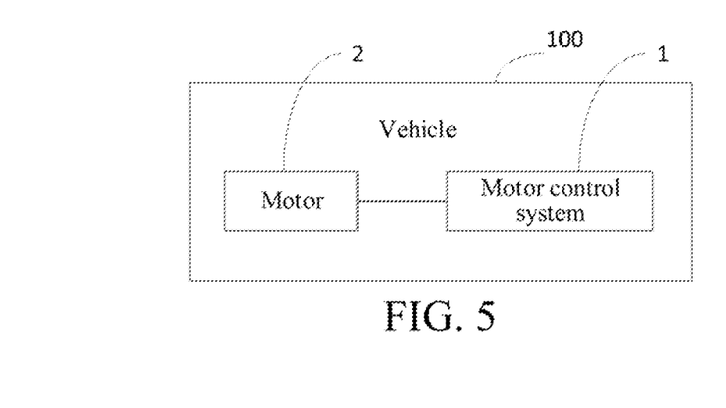
FIG. 5 is a block diagram of a vehicle according to an embodiment of the present disclosure.

FIG. 5 is a block diagram of a vehicle according to an embodiment of the present disclosure. As shown in FIG. 5, the vehicle 100 in this embodiment of the present disclosure includes a motor 2 and the electric motor control system 1 in the foregoing embodiment. The electric motor control system 1 is configured to control the motor. For the structure and working process of the electric motor control system 1, reference may be made to the description of the foregoing embodiment.

According to the vehicle 100 in this embodiment of the present disclosure, by using the electric motor control system 1 in the foregoing embodiment, the independent control of the drive and diagnosis mechanisms can be implemented. Therefore, when an intermediate step of controlling the motor fails, a control state can be timely and effectively ensured, thereby improving the safety.

In the descriptions of the specification, descriptions using reference terms "an embodiment", "some embodiments", "an exemplary embodiment", "an example", "a specific example", or "some examples" mean that specific characteristics, structures, materials, or features described with reference to the embodiment or example are included in at least one embodiment or example of the present disclosure. In this specification, schematic descriptions of the foregoing terms do not necessarily refer to the same embodiment or example.

Although certain embodiments of the present disclosure have been shown and described, a person of ordinary skill in the art may be understood that various changes, modifications, replacements, and variations may be made to the embodiments without departing from the principles and spirit of the present disclosure, and the scope of the present disclosure is as defined by the appended claims and their equivalents.

What is claimed is:

1. An electric motor control system, comprising:
   a motor drive module;
   a multi-core processing module, comprising a main function core and a lockstep monitoring core, wherein the main function core is configured to:
   obtain sampling data as an input to the main function core, and generate a motor control signal according to the sampling data as an output of the main function core to the motor drive module to drive a motor, wherein the lockstep monitoring core is configured to monitor the sampling data of the main function core, a running status of the main function core, the motor control signal, and a running status of the motor, and when any one of the sampling data, the running status of the main function core, the motor control signal, and the running status of the motor is abnormal, the lockstep monitoring core performs drive control limitation and outputs a safety trigger signal; and
   a safety logic module, connected to the multi-core processing module, and configured to output an instruction for prohibiting execution of the motor control signal to the motor drive module when receiving the safety trigger signal.

2. The electric motor control system according to claim 1, further comprising:
   an auxiliary control module, connected to the multi-core processing module and the motor drive module, and configured to: obtain the sampling data, and generate the motor control signal according to the sampling data when the main function core fails, wherein
   the lockstep monitoring core is further configured to determine whether the motor control signal is abnormal when the auxiliary control module fails;
   when the motor control signal is abnormal, the lockstep monitoring core performs drive control limitation and outputs the safety trigger signal; and
   the safety logic module is connected to the multi-core processing module, and is configured to output the instruction for prohibiting the execution of the motor control signal to the motor drive module when receiving the safety trigger signal.

3. The electric motor control system according to claim 1, further comprising a power management module, wherein the power management module is configured to: provide a power signal to the multi-core processing module, monitor a running status of the multi-core processing module, and output a safety control signal when the multi-core processing module fails; and
   the safety logic module is connected to the power management module, and is configured to output the instruction for prohibiting the execution of the motor control signal to the motor drive module when receiving the safety control signal.

4. The electric motor control system according to claim 3, further comprising:
   a low-voltage power supply module, connected to the power management module and the motor drive module, and configured to stop supplying power to the motor drive module when receiving a first power supply stop signal, wherein
   the multi-core processing module is connected to the low-voltage power supply module, and is further configured to respond to the safety trigger signal outputted by the lockstep monitoring core, and when the motor drive module fails to respond to the safety trigger signal of the lockstep monitoring core as expected, the lockstep monitoring core outputs the first power supply stop signal.

5. The electric motor control system according to claim 4, wherein the low-voltage power supply module comprises:
   a first DC (direct current)/DC unit, wherein the first DC/DC unit is connected to the motor drive module and the multi-core processing module, and is configured to: supply power to the motor drive module, and stop outputting power when receiving the first power supply stop signal; and
   a low-voltage power supply, connected to the first DC/DC unit and the power management module through a first reverse prevention diode, and configured to supply power to the power management module.

6. The electric motor control system according to claim 4, further comprising:
   a backup power supply module, connected to the power management module and the motor drive module, and configured to output a power supply signal to supply power to the power management module and the motor drive module when receiving a first power supply signal, wherein
   the multi-core processing module is connected to the backup power supply module, and is configured to output the first power supply signal to the backup power supply module when an output of the low-voltage power supply is abnormal.

7. The electric motor control system according to claim 6, wherein the backup power supply module comprises:
   a high-voltage power supply and a second DC/DC unit, wherein the high-voltage power supply is connected to the power management module and the first DC/DC unit through the second DC/DC unit, wherein
   the multi-core processing module is connected to the second DC/DC unit, and is configured to: control the second DC/DC unit to be connected when the output of the low-voltage power supply is abnormal, or control the second DC/DC unit to be disconnected when an output of the second DC/DC unit is abnormal.

8. The electric motor control system according to claim 7, wherein the second DC/DC unit comprises:
   a DC/DC control unit, wherein a first end of the DC/DC control unit is connected to the high-voltage power supply; and
   a switch unit, wherein a first end of the switch unit is connected to a second end of the DC/DC control unit, a second end of the switch unit is connected to the power management module and the first DC/DC unit through a second reverse prevention diode, and a control end of the switch unit is connected to the multi-core processing module.

9. An electric motor control system, comprising:
a motor drive module;
a multi-core processing module, comprising a main function core and a lockstep monitoring core, wherein the main function core is configured to:
obtain sampling data, and generate a motor control signal according to the sampling data, wherein the lockstep monitoring core is configured to monitor the sampling data of the main function core, a running status of the main function core, the motor control signal, and a running status of a motor, and when any one of the sampling data, the running status of the main function core, the motor control signal, and the running status of the motor is abnormal, the lockstep monitoring core performs drive control limitation and outputs a safety trigger signal; and
a safety logic module, connected to the multi-core processing module, and configured to output an instruction for prohibiting execution of the motor control signal to the motor drive module when receiving the safety trigger signal,
wherein
the safety logic module comprises a first enable end and a second enable end, the first enable end is connected to a low side of the motor drive system, and the second enable end is connected to a high side of the motor drive module;
the multi-core processing module is further configured to output a first safety trigger signal or a second safety trigger signal when the motor drive signal is abnormal; and
the safety logic module is configured to: enable the low side of the motor drive module through the first enable end according to the first safety trigger signal, or enable the high side of the motor drive module through the second enable end according to the second safety trigger signal, to stop driving the motor.

10. A vehicle, comprising:
a motor; and
an electric motor control system configured to control the motor, wherein the electric motor control system comprises:
a motor drive module;
a multi-core processing module, comprising a main function core and a lockstep monitoring core, wherein the main function core is configured to:
obtain sampling data as an input to the main function core, and generate a motor control signal according to the sampling data as an output of the main function core to the motor drive module to drive a motor, wherein the lockstep monitoring core is configured to monitor the sampling data of the main function core, a running status of the main function core, the motor control signal, and a running status of the motor, and when any one of the sampling data, the running status of the main function core, the motor control signal, and the running status of the motor is abnormal, the lockstep monitoring core performs drive control limitation and outputs a safety trigger signal; and
a safety logic module, connected to the multi-core processing module, and configured to output an instruction for prohibiting execution of the motor control signal to the motor drive module when receiving the safety trigger signal.

11. The vehicle according to claim 10, wherein the electric motor control system further comprises:
an auxiliary control module, connected to the multi-core processing module and the motor drive module, and configured to: obtain the sampling data, and generate the motor control signal according to the sampling data when the main function core fails, wherein
the lockstep monitoring core is further configured to determine whether the motor control signal is abnormal when the auxiliary control module fails;
when the motor control signal is abnormal, the lockstep monitoring core performs drive control limitation and outputs the safety trigger signal; and
the safety logic module is connected to the multi-core processing module, and is configured to output the instruction for prohibiting the execution of the motor control signal to the motor drive module when receiving the safety trigger signal.

12. The vehicle according to claim 10, wherein the electric motor control system further comprises:
a power management module, wherein the power management module is configured to: provide a power signal to the multi-core processing module, monitor a running status of the multi-core processing module, and output a safety control signal when the multi-core processing module fails,
wherein the safety logic module is connected to the power management module, and is configured to output the instruction for prohibiting the execution of the motor control signal to the motor drive module when receiving the safety control signal.

* * * * *